United States Patent [19]

Lai

[11] Patent Number: 5,129,666
[45] Date of Patent: Jul. 14, 1992

[54] ALUMINUM ALLOY BICYCLE FRAME

[76] Inventor: Richard Lai, No. 302-1, Chang-Yuan Rd., Chang-Sha Tsun, Hua-Tan Hsiang, Changhua Hsien, Taiwan

[21] Appl. No.: 639,295

[22] Filed: Jan. 10, 1991

[51] Int. Cl.$^5$ .............................................. B62K 19/22
[52] U.S. Cl. ................................. 280/281.1; 403/267; 403/268
[58] Field of Search ................... 280/278, 281.1, 287, 280/288.3; 403/265, 267, 343, 268; 285/355, 915

[56] References Cited

U.S. PATENT DOCUMENTS

| | | | |
|---|---|---|---|
| 2,284,624 | 6/1942 | Schwinn | 280/281.1 |
| 3,146,142 | 8/1964 | Maly | 285/915 |
| 3,784,235 | 1/1974 | Kessler et al. | 285/915 |
| 4,705,286 | 11/1987 | Lauzier et al. | 280/281.1 |
| 4,915,536 | 4/1990 | Bear et al. | 403/265 |
| 5,018,900 | 5/1991 | Darrin | 280/281.1 |
| 5,052,848 | 10/1991 | Nakamura | 280/281.1 |

FOREIGN PATENT DOCUMENTS

| | | | |
|---|---|---|---|
| 635271 | 9/1936 | Fed. Rep. of Germany | 280/281.1 |
| 3015298 | 11/1980 | Fed. Rep. of Germany | 280/281.1 |

Primary Examiner—Charles A. Marmor
Assistant Examiner—A. M. Boehler
Attorney, Agent, or Firm—Nixon & Vanderhye

[57] ABSTRACT

An aluminum alloy bicycle frame includes a set of tubes and a set of joint members for connecting the tubes, each of the joint members having a tubular joining portion. Each of the tubes has an externally threaded end provided with adhesive glue, and the tubular joining portion of each of the joint members has a threaded inner face provided with adhesive glue. The externally threaded ends of the tubes are respectively screwed into and adhered to the tubular joining portions of the joint members. This frame has strong joints which are clean and smooth in appearance, without requiring a high degree skill or unusually expensive materials.

3 Claims, 6 Drawing Sheets

ALUMINUM ALLOY BICYCLE FRAME

BACKGROUND OF THE INVENTION

1. Field Of The Invention

This invention relates to an aluminum alloy bicycle frame, more particularly to an aluminum alloy bicycle frame which has good joining strength and is easily assembled.

2. Background Of The Prior Art

Referring to FIG. 1, a conventional bicycle frame made of aluminum alloy includes a set of tubes 1 and a set of joint members 2 for connecting the tubes 1. The tubes 1 are respectively joined with the joint members 2 by soldering or adhering. While a tube 1 is joined with a joint member 2 by soldering, the joint is often weak, as a result of the effects of high temperature treatment. The soldered surface of the tube 1 and the joint member 2 is not smooth, and makes for a poor appearance. Soldering the tubes 1 and the joint members 2 requires high quality flux, and a high degree of skill, resulting in high cost and low production.

If, on the other hand, the tube 1 is joined with the joint member 2 by adhering, the strength of the joint is low, resulting in loosening over time.

SUMMARY OF THE INVENTION

Therefore, the object of the present invention is to provide an improved aluminum alloy bicycle frame which has strong joints and an attractive appearance, and can be mass produced at low cost.

Accordingly, an aluminum alloy bicycle frame of the present invention includes a set of tubes, and a set of joint members for connecting the tubes, each of the joint members having a tubular joining portion. Each of the tubes has an externally threaded end provided with adhesive glue, and the tubular joining portion of each of the joint members has a threaded inner face provided with adhesive glue. Since the externally threaded ends of the tubes are respectively screwed to as well as adhered to the tubular joining portions of the joint members, the joints are strong and have a clean, smooth appearance. Because of the double joining effect and simplicity of the operation of screwing and adhering, the flux and the special skill are unnecessary, so the aluminum alloy bicycle frame can be mass produced at low cost.

BRIEF DESCRIPTION OF THE DRAWINGS

Other features and advantages of this invention will become apparent in the following detailed description of the preferred embodiment with reference to the accompanying drawings, of which.

DETAILED DESCRIPTION OF THE PREFERRED EMBODIMENT

Figure 1:
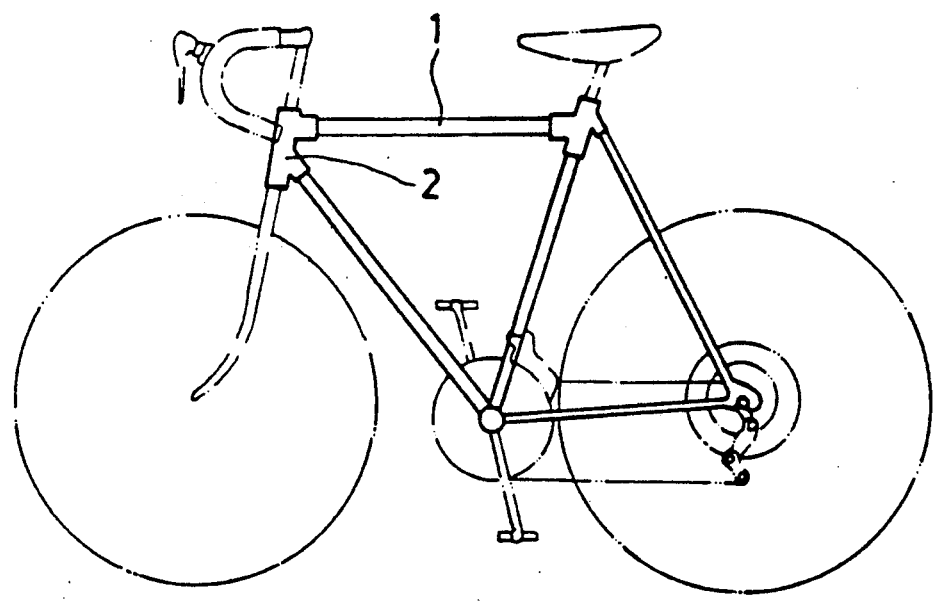
FIG. 1 is a schematic view of a bicycle incorporating a conventional aluminum alloy bicycle frame.
Figure 2:
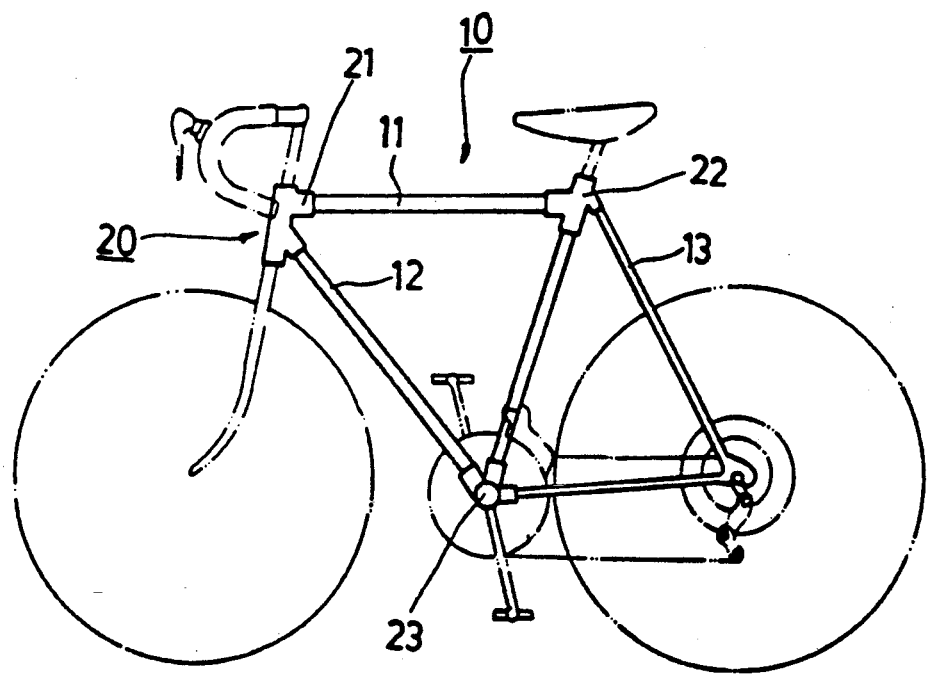
FIG. 2 is a schematic view of a bicycle incorporating the aluminum alloy bicycle frame of the first preferred embodiment of the present invention.
Figure 3:
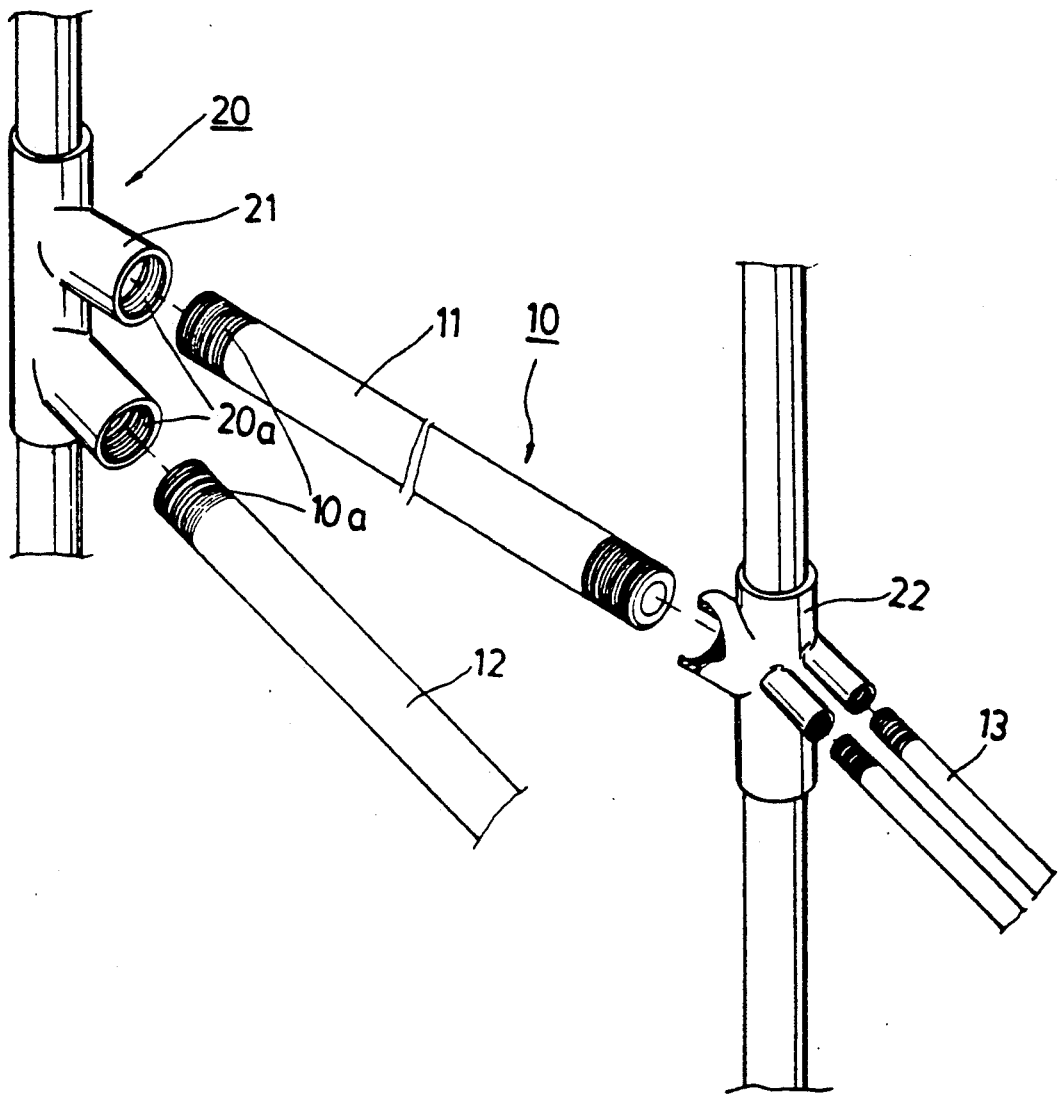
FIG. 3 is a perspective view illustrating the joining operation of the tubes and the joint members for the aluminum alloy bicycle frame of the first preferred embodiment of the present invention shown in FIG. 2.
Figure 4:
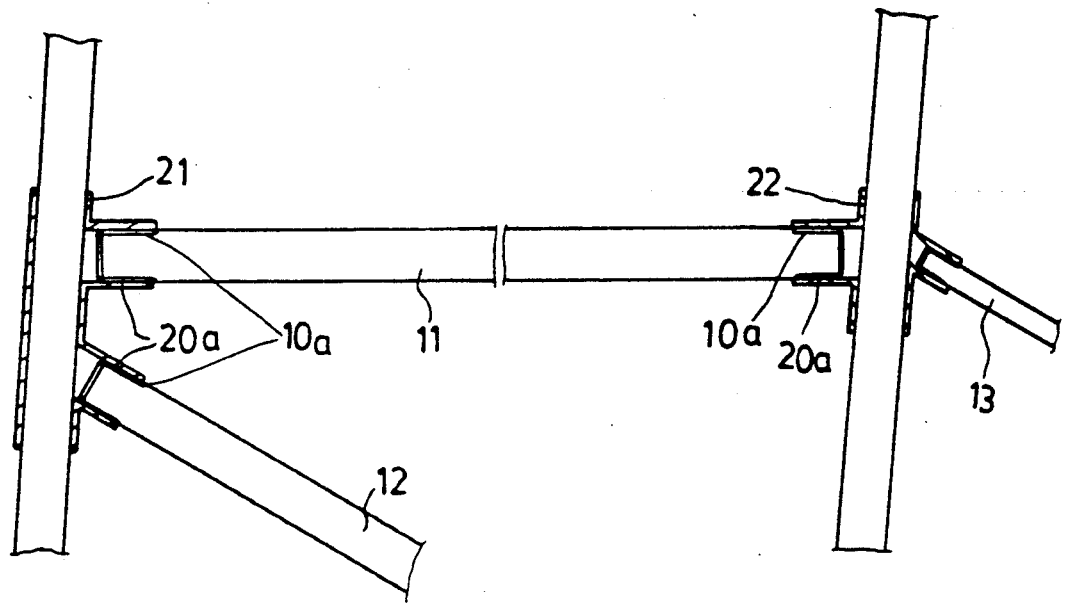
FIG. 4 is a sectional view of the tubes joined with the joint members for the aluminum alloy bicycle frame of the first preferred embodiment of the present invention shown in FIG. 2.

Referring to FIGS. 2 and 3, an aluminum alloy bicycle frame of the first preferred embodiment of the present invention includes a set of tubes 10 which set includes a cross bar tube 11, a down tube 12, and a seat tube 13; and a set of joint members 20 each of which has a tubular joining portion (20a). The set of joint members 20 includes a first joint member 21, a second joint member 22, and a third joint member 23 for respectively connecting the cross bar tube 11, the down tube 12, and the seat tube 13. Referring to FIGS. 3 and 4, each of the tubes 10 has an externally threaded end (10a) provided with adhesive glue, and each of the tubular joining portions (20a) of the joint members 20 has a threaded inner face provided with adhesive glue. The externally threaded ends (10a) of the tubes 10 can be fine thread ends, and the threaded inner faces of the tubular joining portions (20a) of the joint members 20 can be fine thread faces. The tubes 10 are respectively screwed into and adhered to the joining portions (20a) of the joint members 20.

Figure 6:
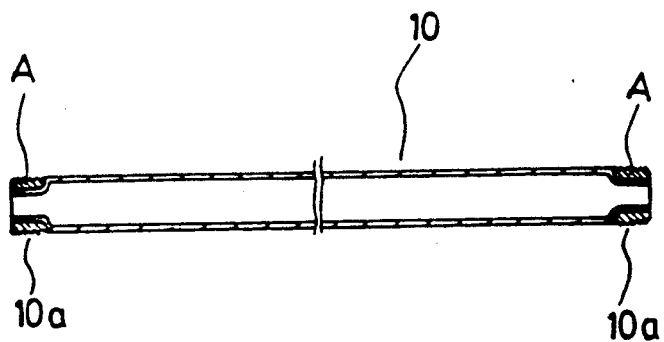
FIG. 6 is a sectional view of one of the tubes of the third preferred embodiment of the aluminum alloy bicycle frame of the present invention.
Figure 5:
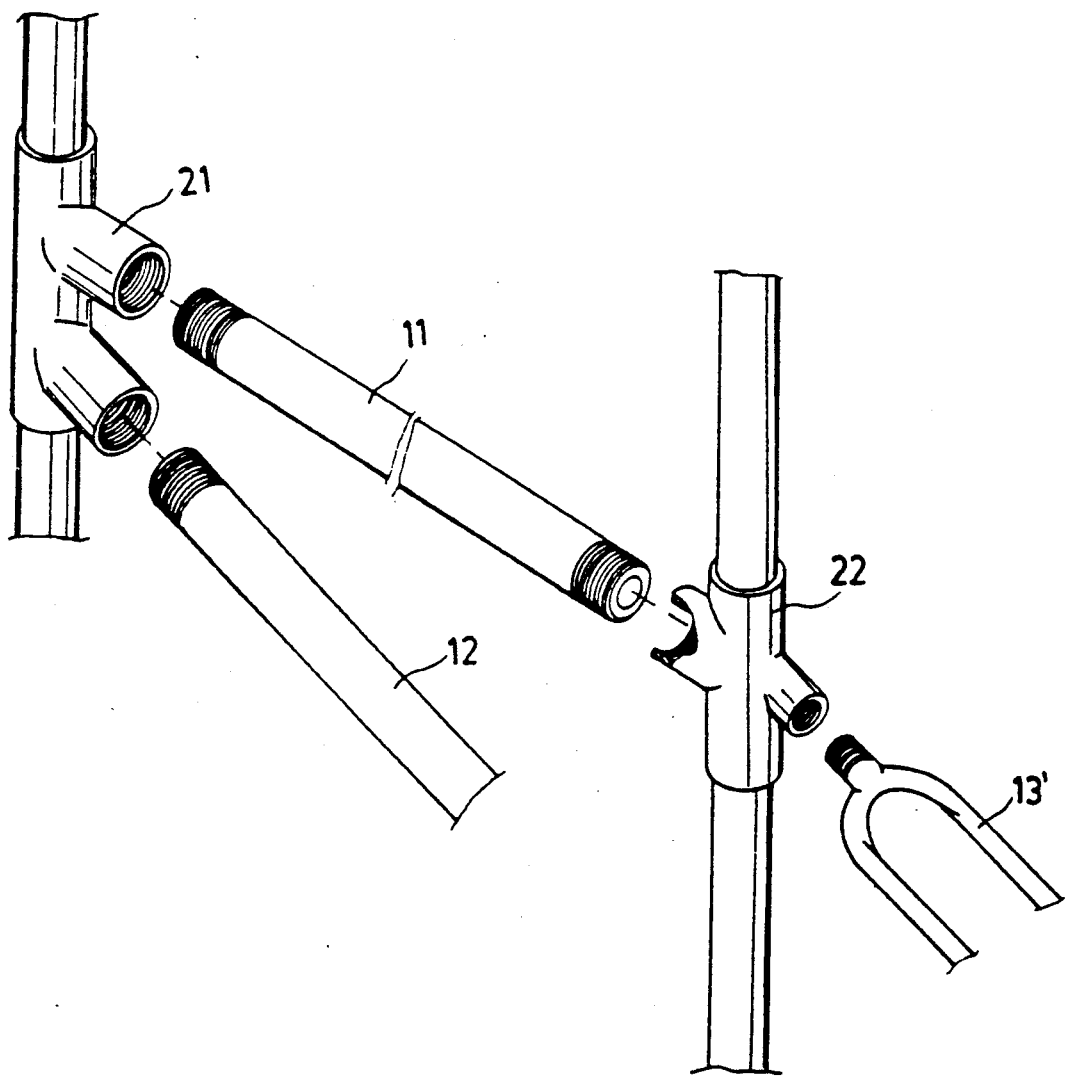
FIG. 5 is a perspective view illustrating the joining operation of the tubes and the joint members for an aluminum alloy bicycle frame of the second preferred embodiment of the present invention.
Figure 7:
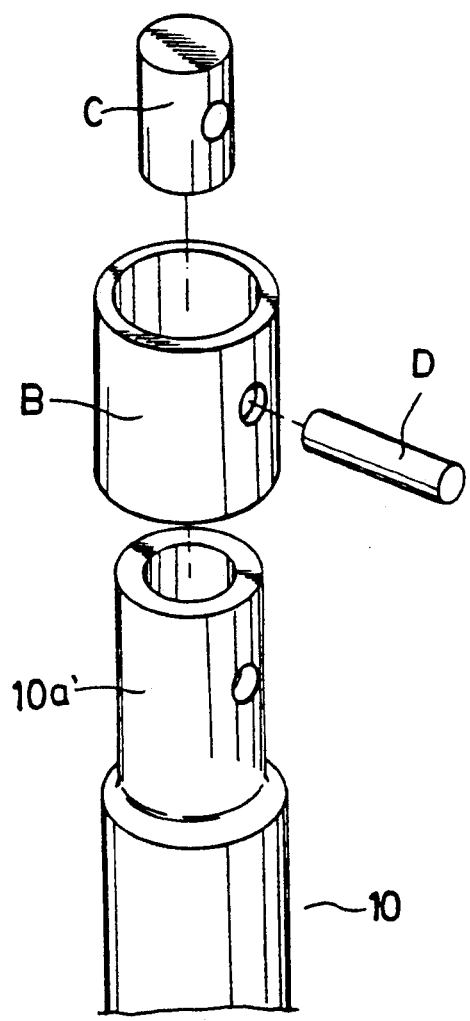
FIG. 7 is an exploded view of a end of one of the tubes of the fourth preferred embodiment of the aluminum alloy bicycle frame of the present invention.
Figure 8:
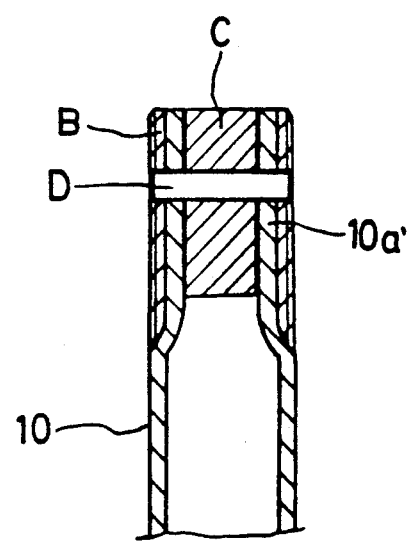
FIG. 8 is a sectional view of the end of one of the tubes of the fourth preferred embodiment of the aluminum alloy bicycle frame of the present invention shown in FIG. 7.

Referring to FIG. 5, an aluminum alloy bicycle frame of the second preferred embodiment has a pair of seat tubes 13'. Referring to FIG. 6, the tubes 10 have contracted ends 10a, the walls of which ends are thickened and strengthened by further cast with aluminum alloy (A), and then threaded. The thickness of the wall of the end is from 0.2 mm to 0.8 mm, and preferably between 0.3 mm to 0.5 mm. Referring to FIGS. 7 and 8, the tubes 10 have contracted ends (10a') over the outer surfaces of which ends are respectively mounted reinforced members (B) made of aluminum. In addition, cylindrical members (c) made of iron or aluminum are fitted into the respective ends (10a') of the tubes. Cotters (D) pass through the respective reinforced members (B), the ends (10a'), and the cylindrical members (C) to joining them together. Afterwards, the outer surfaces of the reinforced members (B) are threaded. So the walls of the ends of the tubes 10 extend radially and inwardly, and the end walls are thicker than the intermediate walls of the tubes 10.

When the externally threaded ends of the tubes 10 are respectively screwed into and adhered to the tubular joining portions 20a of the joint members 20, the joints are strong and clean in appearance. And because of the double joining effect and simplicity of the screwing and adhering operation, quality flux and special skill are unnecessary, so that aluminum alloy bicycle frame of this invention can be mass produced at low cost.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modification and equivalent arrangements.

I claim:

1. An aluminum alloy bicycle frame including a set of tubes and a set of joint members for connecting said tubes, each of said joint members having a tubular joining portion; wherein the improvement is characterized by:

each of said tubes having a constricted end, said constructed end being reinforced and including an outer reinforcing member fixedly sleeved therearound, and an inner cylindrical reinforcing member securely inserted therein, said outer reinforcing member being externally threaded and provided with adhesive glue, and said tubular joining portion of each of said joint members having a threaded inner face and provided with adhesive glue, so that said externally threaded ends of said tubes can be respectively screwed into and adhered to said tubular joining portions of said joint members.

2. An aluminum alloy bicycle frame as claimed in claim 1, wherein said externally threaded ends of said tubes are fine thread ends, and said threaded inner faces of said tubular joining portions of said joint members are fine thread faces.

3. An aluminum alloy bicycle frame as claimed in claim 1, wherein each constricted end of said tubes includes a wall extending radially and inwardly so that the wall of the end of said tube is thicker than the wall in the intermediate portion of said tube.

* * * * *